United States Patent
Bandyopadhyay et al.

(10) Patent No.: US 11,182,414 B2
(45) Date of Patent: *Nov. 23, 2021

(54) SEARCH QUERIES OF MULTI-DATATYPE DATABASES

(71) Applicant: International Business Machines Corporation, Armonk, NY (US)

(72) Inventors: Bortik Bandyopadhyay, Yorktown Heights, NY (US); Rajesh Bordawekar, Yorktown Heights, NY (US); Tin Kam Ho, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 15/463,179

(22) Filed: Mar. 20, 2017

(65) Prior Publication Data

US 2018/0267977 A1    Sep. 20, 2018

(51) Int. Cl.
*G06F 16/33*    (2019.01)
*G06F 16/28*    (2019.01)
(Continued)

(52) U.S. Cl.
CPC ........ *G06F 16/3347* (2019.01); *G06F 16/284* (2019.01); *G06F 16/313* (2019.01); *G06F 16/90335* (2019.01); *G06N 20/00* (2019.01)

(58) Field of Classification Search
CPC ........... G06F 17/3069; G06F 17/30595; G06F 17/30979; G06F 16/3347; G06F 16/2452;
(Continued)

(56) References Cited

U.S. PATENT DOCUMENTS 5,548,749 A    8/1996  Kroenke et al.
7,827,170 B1 *  11/2010  Horling .................. G06F 16/93
                                                707/722
(Continued)

FOREIGN PATENT DOCUMENTS

DE         69419184        12/1999

OTHER PUBLICATIONS

Apache Foundation, "Apache spark: A fast and general engine for large scale data processing", http://spark.apache.org., last visited on Dec. 28, 2016, pp. 1-2.

(Continued)

*Primary Examiner* — Albert M Phillips, III
*Assistant Examiner* — Fatima P Mina
(74) *Attorney, Agent, or Firm* — Fleit Intellectual Property Law; Donna Flores

(57) ABSTRACT

A computer-implemented method, cognitive intelligence system and computer program product adapt a relational database containing multiple data types. Non-text tokens in the relational database are converted to a textual form. Text is produced based on relations of tokens in the relational database. A set of word vectors is produced for the tokens based on the text. A cognitive intelligence query expressed as a structured query language (SQL) query may be applied to the relational database using the set of word vectors. The form of non-text tokens is one of a numeric value, an SQL type, an image, a video, a time series, latitude and longitude, or chemical structures. A single word embedding model may be applied over one or more tokens in the text. A plurality of sets of preliminary word vectors are computed by applying more than one embedding model over all tokens in the text. The preliminary word vector sets are merged to form the set of word vectors.

18 Claims, 7 Drawing Sheets

(51) Int. Cl.
*G06F 16/903* (2019.01)
*G06F 16/31* (2019.01)
*G06N 20/00* (2019.01)

(58) Field of Classification Search
CPC .. G06F 16/3329; G06F 16/313; G06F 16/284; G06F 16/90335; G06N 20/00; G06K 9/6218
See application file for complete search history.

(56) References Cited

U.S. PATENT DOCUMENTS

| | | | |
|---|---|---|---|
| 8,190,555 B2 | 5/2012 | Venugopal et al. | |
| 9,454,524 B1* | 9/2016 | Modani | G06K 9/6215 |
| 2004/0117189 A1* | 6/2004 | Bennett | G09B 7/00 704/270.1 |
| 2006/0041544 A1* | 2/2006 | Santosuosso | G06F 17/30342 |
| 2006/0173834 A1* | 8/2006 | Brill | G06F 16/248 |
| 2010/0312784 A1* | 12/2010 | Boyd | G06F 16/24552 707/769 |
| 2014/0164036 A1 | 6/2014 | Prieto | |
| 2015/0220597 A1* | 8/2015 | Simhadri | G06F 16/24534 707/797 |
| 2015/0262282 A1* | 9/2015 | Walti | G06Q 30/0631 705/26.7 |
| 2015/0293946 A1 | 10/2015 | Fong et al. | |
| 2015/0331846 A1* | 11/2015 | Guggilla | G06F 17/2705 704/9 |
| 2016/0291156 A1* | 10/2016 | Hjelmstad | G01S 7/4911 |
| 2017/0024660 A1* | 1/2017 | Chen | G06F 21/552 |
| 2017/0300814 A1* | 10/2017 | Shaked | G06N 3/0472 |
| 2017/0329868 A1* | 11/2017 | Lindsley | G06N 5/02 |
| 2018/0052929 A1* | 2/2018 | Liu | G06F 17/3069 |
| 2018/0173803 A1* | 6/2018 | Grover | G06F 16/248 |
| 2018/0190249 A1* | 7/2018 | Roblek | G10H 1/0025 |

OTHER PUBLICATIONS

Bengio, Y., et al., "A Neural Probabilistic Language Model", Journal of Machine Learning Research, Feb. 2003, pp. 1137-1155.

Gray, J., et al., "Data Cube: A Relational Aggregation Operator Generalizing Group-By, Cross-Tab, and Sub-Totals", Data Mining and Knowledge Discovery, 1997, vol. 1, No. 1, pp. 1-16.

Mikolov, T., et al., "Distributed Representations of Words and Phrases and their Compositionality", Proceedings of the 27th Annual Conference on Neural Information Processing Systems, Dec. 5-10, 2013, pp. 1-9.

Pennington, J., et al., "GloVe: Global Vectors for Word Representation", Proceedings of the 2014 Conference on Empirical Methods in Natural Language Processing, Oct. 25-29, 2014, pp. 1-12.

Mikolov, T., "word2vec: Tool for computing continuous distributed representations of words", https://code.google.com/p/word2vec, last visited on Jan. 4, 2017, pp. 1-7.

Bordawekar, R., et al., "Using Word Embedding to Enable Semantic Queries in Relational Databases", Proceedings of the EDBT/ICDT Joint Conference, Mar. 21-24, 2017, pp. 1-4.

* cited by examiner

600

SELECT X.pCode, Y.pCode, X.pName, Y.pName, X.ingredients, Y.ingredients

FROM SubViewOfFoodFactsTable X, SubViewOfFoodFactsTable Y

WHERE (X.pCode <> Y.pCode) AND
(X.countries <> 'countries_empty') AND
(Y.countries <> 'countries_empty') AND
(X.ingredients <> 'ingredients_text_empty') AND
(Y.ingredients <> 'ingredients_text_empty') AND
⎫
⎬ 602
⎭

(proximityAvgMergedData(X.countries, Y.countries) > 0.95) AND
(proximityAvgMergedData(X.vitamins, Y.vitamins) > 0.75) AND
(proximityAvgMergedData(X.carbohydrates, Y.carbohydrates) > 0.75) AND
(proximityAvgMergedData(X.aminoacids, Y.aminoacids) > 0.75) AND
(proximityAvgMergedData(X.fattyacids, Y.fattyacids) < 0.50) AND
(proximityAvgMergedData(X.minerals, Y.minerals) > 0.75) AND
(proximityAvgMergedData(X.ingredients, Y.ingredients) > 0.75)
⎫
⎬ 604
⎭

LIMIT 20

FIG. 6

SEARCH QUERIES OF MULTI-DATATYPE DATABASES

BACKGROUND

The present invention generally relates to search queries and more particularly relates to search queries of databases containing multiple data types.

A large amount of information remains latent within a relational database. For example, database columns that contain different types of data, e.g., numerical values, images, dates, etc., possess significant latent information in the form of inter-column and intra-column relationships. Further, a relational data model neglects many inter-column or intra-column relationships. Further still, the traditional Structured Query Language (SQL) queries lack a holistic view of the underlying relations, and thus are unable to extract and exploit semantic relationships that are collectively generated by database relations.

BRIEF SUMMARY

In various embodiments, a computer-implemented method, cognitive intelligence system and computer program product for adapting a relational database containing multiple data types are disclosed. In accordance with one embodiment of the present invention, the method comprises converting non-text tokens in the relational database to a textual form, producing text based on relations of tokens in the relational database, and producing a set of word vectors for the tokens based on the text.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 6 depicts an SQL cognitive intelligence (CI) query example, in accordance with the present invention.

DETAILED DESCRIPTION

Figure 1:
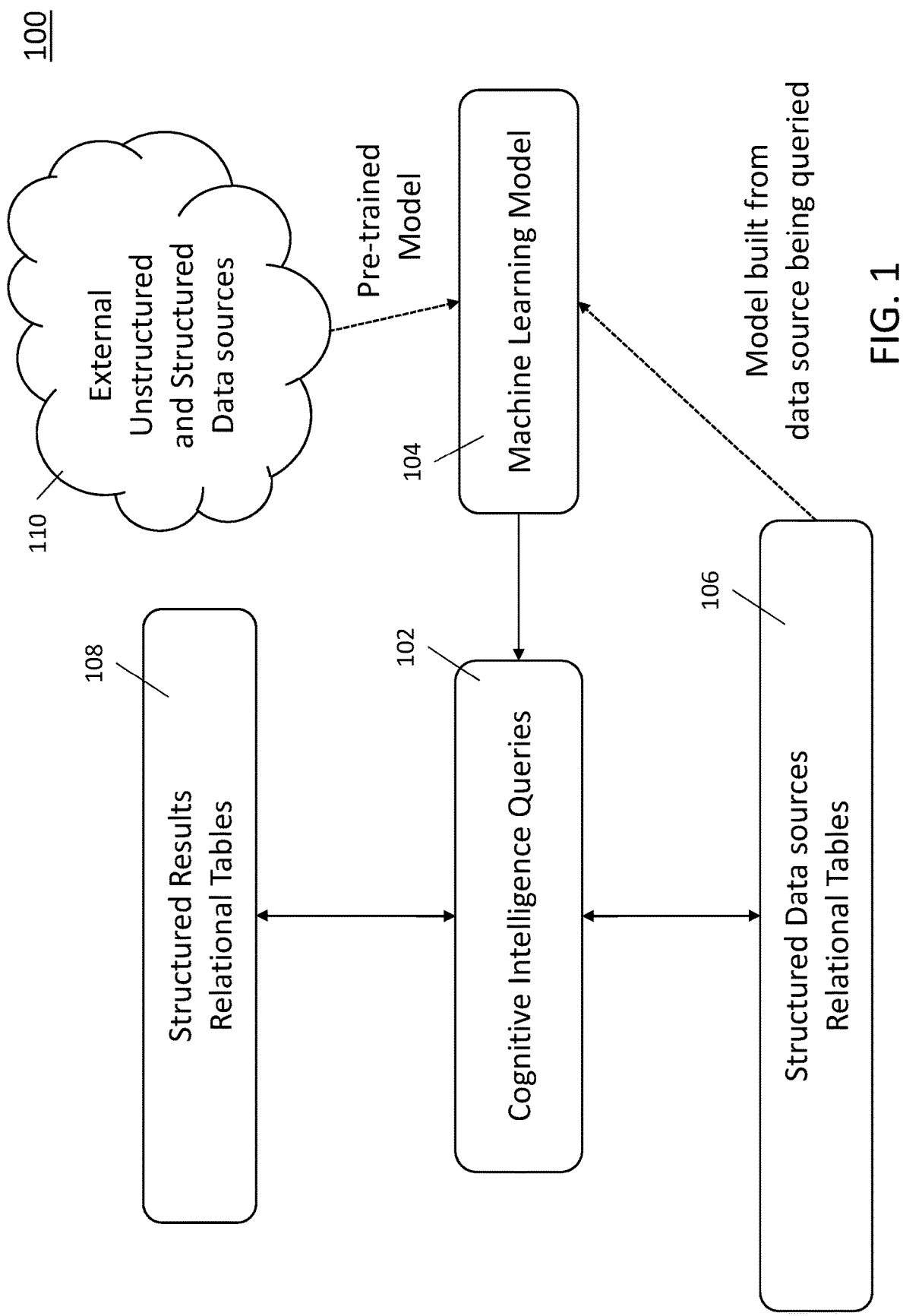
FIG. 1 is a block diagram illustrating one example of an operating environment in accordance with the present invention.

Some embodiments of the present invention facilitate responses to queries in relational databases using cognitive learning. For example, some computer-implemented method embodiments enable relational databases to capture and exploit semantic contextual similarities using standard SQL queries and a new class of SQL-based queries: Cognitive Intelligence (CI) queries.

By way of overview, for a given relational database, such as a database containing information about employees of a specific company, typical SQL queries only return a result if there is a match for the query. For example, if a query wants information for employee A, such as salary, title, etc., an answer is returned only if there is an employee A. However, using CI queries, in accordance with the present invention, an answer may be returned by examining the relationship of each word embedded in the database. For traditional SQL purposes, attributes such as name, age, gender, title, etc., are independent and this information is not exploited by the query.

Some embodiments of the present invention use word embedding, which is an unsupervised machine learning technique from natural language processing (NLP), to extract latent information. Disclosed techniques may also be applicable to other data models such as Multidimensional online analytical processing (MOLAP), JavaScript Object Notation (JSON), eXtensible Markup Language (XML), comma-separated value (CSV) files, spreadsheets, etc.

In word embedding, a d-dimensional vector space is fixed. Each word in a text corpus (e.g., collection of documents) is associated with a dimension d vector of real numbers. The assignment of words to vectors should be such that the vectors encode the meaning of the words. Ideally, if two words are closely related (i.e. have similar meaning), their vectors should point in similar directions. In other words, the cosine distance between their vectors should be relatively high. By closely related words we mean words that appear together often in the text corpus. By appear together, we mean within close proximity. Conversely, if words are unrelated, the cosine distance between their vectors should be relatively small. Some refinements of the calculation of closeness weigh the proximity and/or consider grammar rules.

Over the last few decades, a number of methods have been introduced for computing vector representations of words in a natural language, such as word2vec or GloVe. Recently, word2vec has gained prominence as the vectors produced appear to capture syntactic as well semantic properties of words. These vector representations seem to capture closeness of words and syntactic (e.g., present-past, singular-plural) as well as semantic closeness of words. One application of word2vec produced vectors was in solving analogy problems, such as . . . a king is to a man like what is to a woman? (answer: queen) by using vector algebra calculations.

Vectors may be produced by either learning on the database itself or using external text, or vector sources. In the relational database context, one way of generating vectors is to apply the word embedding method to a token sequence generated from the database: each row would correspond to a sentence and a relation would correspond to a document. Thus, vectors enable a dual view of the data: relational and (meaningful) text. Word embedding then may extract latent semantic information in terms of word associations and co-occurrences and encode it in word vectors. Thus, the vectors capture first inter- and intra-attribute relationships within a row (sentence) and then aggregate these relationships across the document to compute the collective semantic relationships. The encoded semantic information then may be used in querying the database. Some embodiments of the present invention integrate word embedding techniques and capabilities into traditional database systems.

FIG. 1 is a block diagram illustrating one example of an operating environment 100 in accordance with the present invention. The operating environment 100 operates as a cognitive data management system to adapt relational databases 106 containing multiple data types for use with cognitive intelligence queries in accordance with one aspect of the present invention. As depicted, cognitive intelligence queries 102 in structured query systems use a machine learning model 104 to answer structured query language (SQL) queries pertaining to structured data source(s) 106, such as in relational tables. Responses to queries are returned as structured results 108, which also may be in the form of relational tables. The machine learning model 104 may be built from the source being queried, i.e. structured data source 106, from pre-trained from external data source 110, such as WIKIPEDIA™ or from the text corpuses of 106 and text from external sources.

Figure 2:
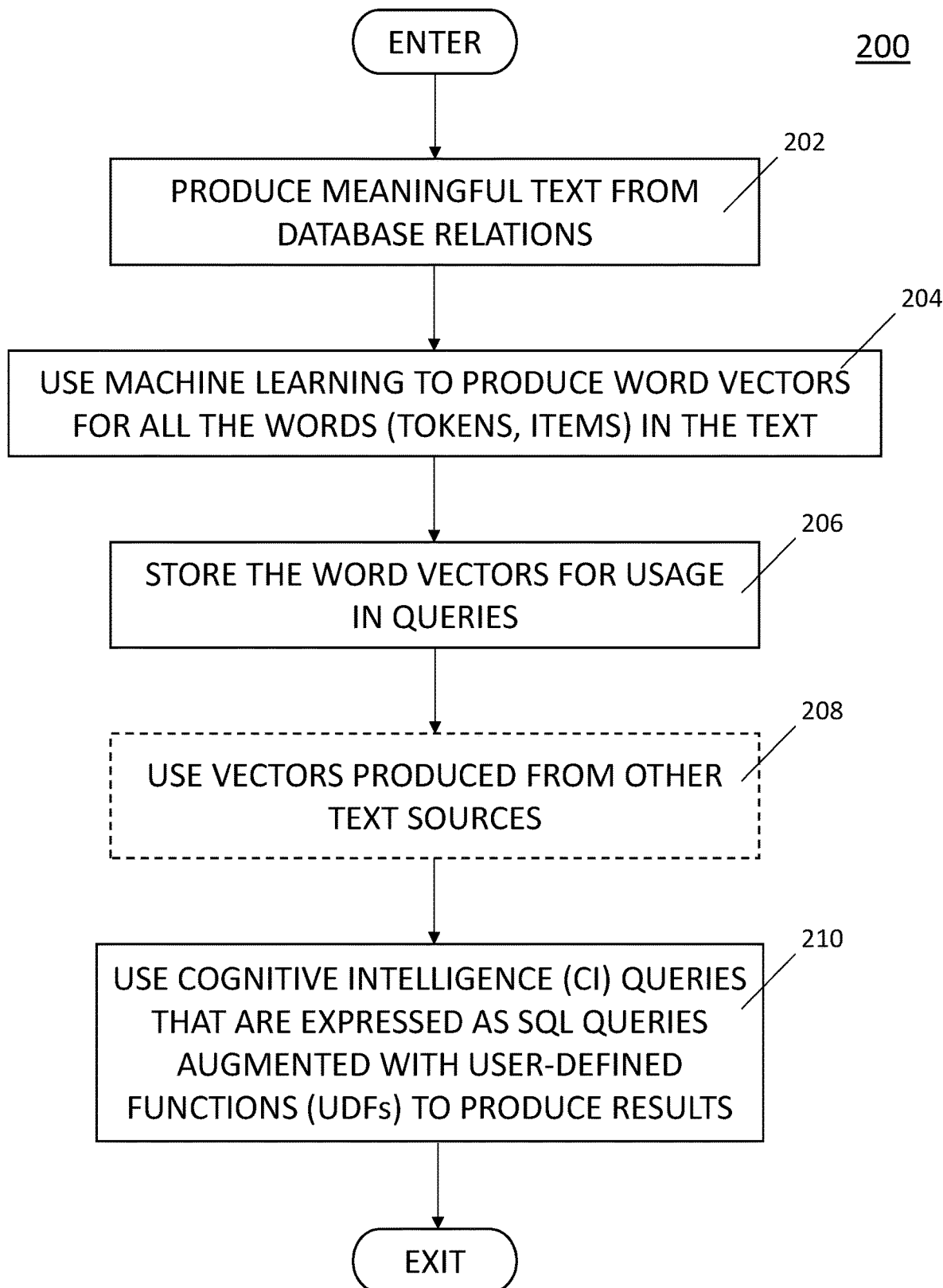
FIG. 2 depicts an exemplary process in accordance with the present invention.
Figure 3:
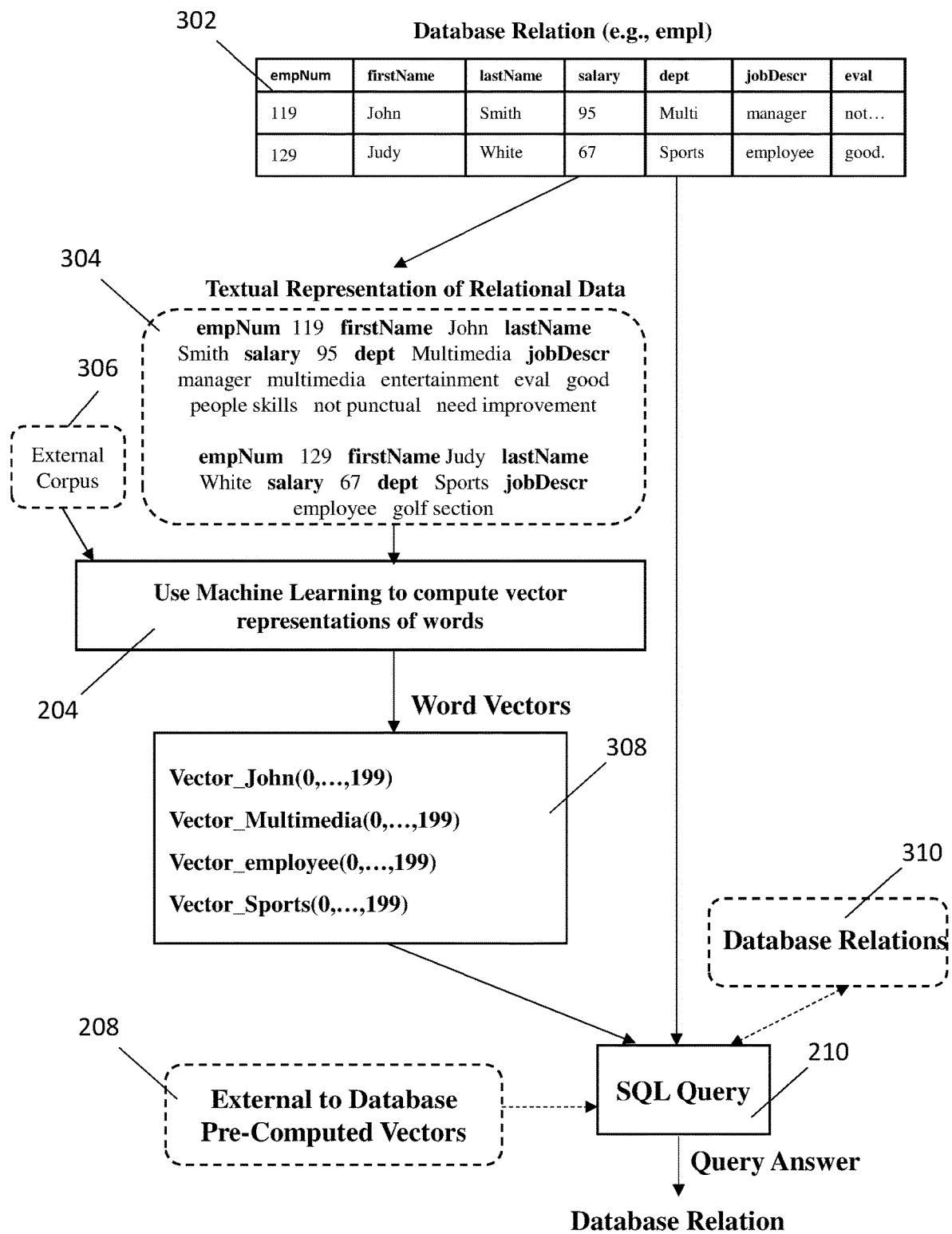
FIG. 3 depicts example states of the process of FIG. 2 in accordance with the present invention.

Exemplary steps for enhancing a system 100 with the cognitive capabilities enabled by word vectors will be described with reference to FIG. 2, which will be further described with reference to the example states of the process is shown in FIG. 3.

FIG. 2 depicts an exemplary process according to one embodiment of the present invention. FIG. 3, which is described in more detail below, depicts example states of the process of FIG. 2.

By way of introduction and overview (only) to the following example, it is assumed that the fields of a relational database are populated with information, e.g., relating to employees of a company (see e.g., FIG. 3, 302) and the tokens, or contents, of each field are related by placement of the rows and columns of the database. A token may be a string, a set or sequence of strings, a numeric value, an image or set of images (e.g., video), a time series, or other SQL types such as date, latitude and longitude, etc. It is further assumed (for purposes of this example only), that non-header rows contain information applicable to a specific employee, while each column contains the same type of information for every employee (see e.g., FIG. 3, 302), employee number (empNum), first name (firstName), last name (lastName), etc.)

Referring now to FIG. 2, at step 202, meaningful data is produced/extracted from database relations. Relevant information in a relational database can be determined by a view of underlying relations generated using traditional Select, Project and Join operators. The database view can be used to generate meaningful text from database tokens.

Which rows or columns are textified (i.e., made into a sequence of tokens) may be controlled by defining a view using standard relational operations. The meaning of a word (i.e. token) can be inferred from by means of its neighbors. The neighborhood context contributes to the overall meaning of the word. A meaning of a database token can be determined from other tokens in the row, the columns of a row, in turn, can be determined by the schema of its view.

For example, meaningful data can be extracted and a model created by mapping, e.g., converting a relational row to a sentence (cf. FIG. 3, 302, 304). Other views may be defined such that not all the token occurrences in the database are used in building the model. One goal of a meaningful text model is to capture relationships between tokens (words, items) across and within columns.

At step 204, machine learning is used to produce word vectors for all words (tokens, items) in the text. For example, an algorithm can compute word vector representations for all words (optionally excluding header words) in the meaningful text. In some embodiments, an external source (or corpus) can also be used for model training (see e.g., FIG. 3, 306). A resulting set of low-dimensional (e.g., dimension=200) semantic representations of words, or "word vectors," can each represent one word (token). Although in this example, a "word" is used as a synonym for "token," not every token may be a valid word in a natural language sense. A token may be a string, a set or sequence of strings, a numeric value, an image or set of images (e.g., video), a time series, or other SQL types such as date, latitude and longitude, etc. The word vectors capture latent inter/intra-attribute relationships from a relational table or database and provide a unified representation of multi-modal relational data. Two words can be considered semantically similar (i.e. have similar meaning) if their word vectors are close in the vector space, based on a distance metric (e.g., cosine distance).

At step 206, the word vectors are stored for usage in queries. In some embodiments, word vectors include a vector for each token in the meaningful text. At step 208, vectors produced from other text sources (see e.g., step 204 and FIG. 3, 306) may optionally be used, solely or in conjunction with database-textified text.

At step 210, cognitive intelligence (CI) queries are used to produce database relation results. In some embodiments, CI queries can be expressed using standard SQL. Some embodiments enable CI queries using the word vectors in the vector space as user-defined functions (UDFs). Upon completion of step 210, the process exits.

FIG. 3 depicts example states of the process of FIG. 2 in accordance with the present invention. As depicted, tokens in relational database 302 are converted to meaningful text sentences 304. For example, the first (non-header) row of relational database 302 can be converted to "empNum 119 firstName John lastName Smith salary 95 dept Multimedia jobDescr 'manager, multimedia, entertainment' eval 'good people skills, not punctual, need improvement'. The meaningful text sentences 304, along with any optional external corpus 306, are then converted to word vectors 308 using machine learning 204. The resulting word vectors 308, such as Vector_John(0, . . . , 199), Vector_Multimedia(0, . . . , 199), etc., are used by an augmented SQL query 210 targeted toward relational databases 310 and provide enhanced results not previously obtainable using traditional SQL queries. In some embodiments, the augmented SQL query 210 can reflect one or more collections of pre-computed vectors 208, e.g., from external databases.

Figure 4:
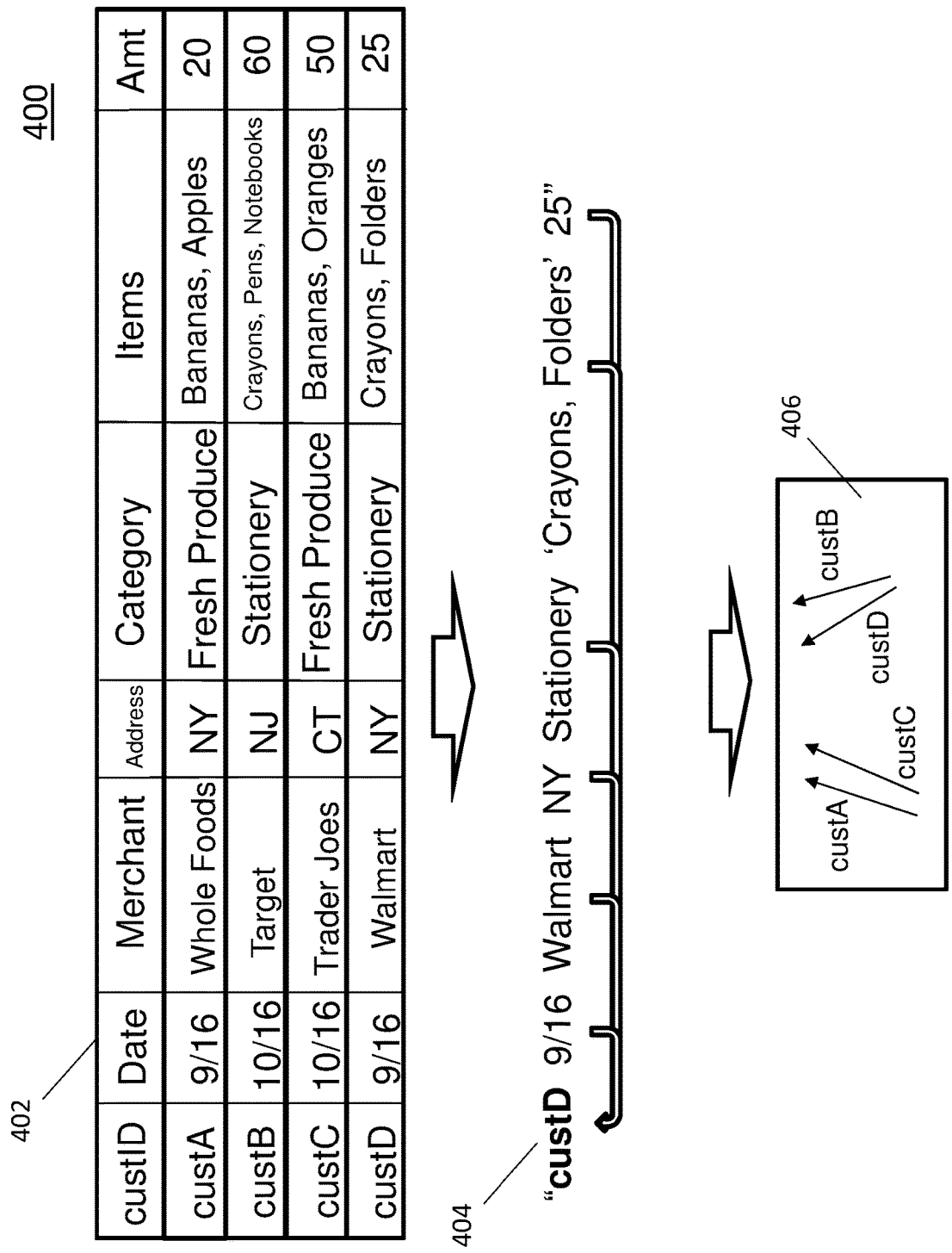
FIG. 4 depicts an example customer analytics query using a first relational view in accordance with the present invention.
Figure 5:
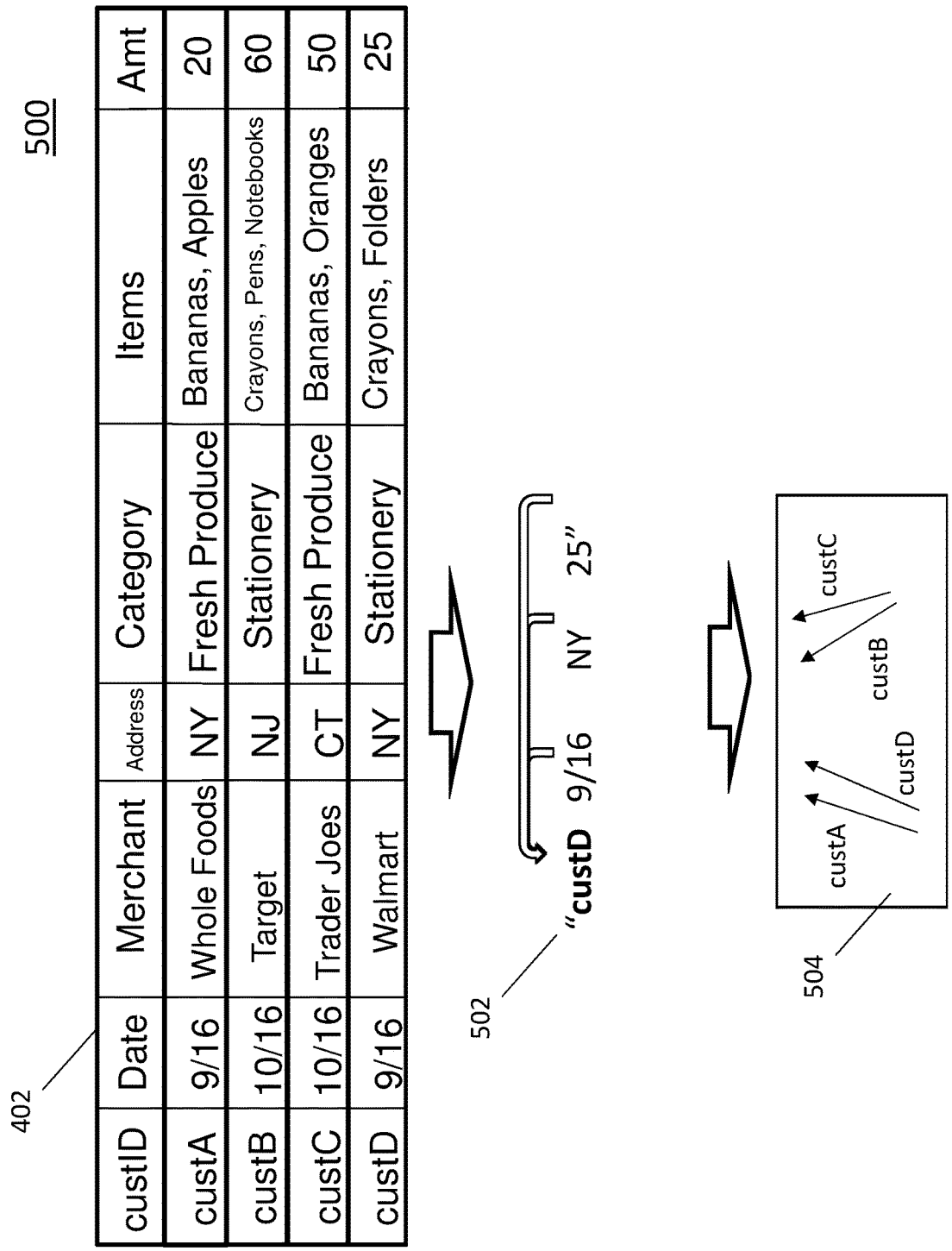
FIG. 5 depicts another example customer analytics query using a second relational view in accordance with the present invention.

FIG. 4 depicts an example customer analytics query using a first relational view in accordance with the present invention. FIG. 5 depicts another example customer analytics query using a second relational view in accordance with the present invention.

Referring now to FIGS. 4 and 5, examples are provided wherein the relational database 402 provides information on customer purchases in retail stores. In FIG. 4, the view produces text containing all of the non-header token occurrences in the database 402. Thus, a vector is created for each token. A query to identify similar customers would examine the word vectors for each customer (i.e. custA, custB, custC, custD). So, for custD, the relevant row (tuple) 404 would be "custD 9/16 Walmart NY Stationery 'Crayons, Folders' 25". In the vector space, the word vector of custD is more similar to the word vector of custB as both bought stationery, including crayons. Likewise, the word vector of custA is more similar to the word vector of custC as both bought fresh produce, including bananas.

In FIG. 5, the view has changed such that the model only uses tokens for custID, Date, Address and Amount." The row (tuple) 502 for custD has changed to "custD 9/16 NY 25". The word vectors are now produced on the text textified from this view. In this case, a query to identify similar customers would determine that custA is more similar to custD as both purchased goods in NY on 9/16 for similar amounts. Likewise, custB is now more similar to custC as both purchased goods on 10/16 for similar amounts. Thus, it should be noted that different results may be returned for the same query depending upon the view or model used.

Support for Multiple Datatypes

In addition to text and basic numeric values, CI queries are supported for SQL types (e.g., date) and other non-SQL types such as images, videos, time series, latitude and longitude, chemical structures, etc.

For actual query execution strategies, there are two approaches: a single model and an ensemble. In the single model approach, multiple data types are converted to text and a single word embedding model is generated from all tokens. For the ensemble approach, more than one embedding model or clustering strategy (discussed below) are used for different data types (e.g., latitude/longitude, images or time-series). A default clustering approach or user-provided similarity functions may be used. The results are computed for each model or clustering group and final results are computed by merging multiple result sets. The final results are merged by finding the intersection between row-sets that represent results for each clustering group. The default clustering approach may use traditional clustering algorithms, such as K-Means. Alternatively, specialized similarity functions for special types may be used, such as using spatial similarity function for latitude and longitude fields.

Support for Numeric Values

There are three approaches to providing meaningful text for numeric tokens. First, the number may simply be converted to a typed string of the form "column heading_number". For example, in a column for an annual date, 2016 becomes "Year_2016". From this point, the process continues as described above to convert the relational database information into meaningful text.

The second approach uses user controlled categorization. For example, the numeric value is converted to a range, such as low, med or high. The user defines the values in the range. A new token is created using the range such that a numeric value in a column becomes a string of the form "column heading_range". Thus, in a relational database having a numerical value for the percentage of chocolate in a food, 75% becomes "chocolate_high" and 18% becomes "chocolate_low".

The third approach uses user controlled clustering. Any traditional clustering algorithm may be used to cluster data (e.g., K-means, hierarchical clustering, etc.). Each numeric value in a column of the relational database is replaced by the ID of the cluster containing that number. For example, in a relational database having a number representing sales dollars, the actual dollar amount is converted to a cluster ID and expressed as "sales_clusterID". So, an actual token value of 5000 may be expressed as "sales_272" where 272 is the cluster ID of the cluster containing 5000.

Support for Images

Four different approaches may be used to convert images to text: image tagging, image classification, binary comparison, or user-specified similarity functions. Each approach can be used with both the single model or the ensemble query execution strategy where one or more of the approaches are used in combination. Image taggers, such as BABYTALK™ or ALCHEMY TAGGER™ may be used to convert images into tags. These textual tags may be used to generate an embedding model. Alternatively, a neural network classification model may be used to classify images into clusters. The images are replaced with their corresponding cluster identifiers and an embedding model is built using the cluster information. The third approach is simply to compare the binary image files for similarity. In this case, a bit-wise comparison for each binary image is performed and the results are compared using binary similarity measures. Finally, the images may be converted to text using user-specified similarity functions. Existing approaches, such as BABYTALK™ or ALCHEMY TAGGER™, may be used for converting images to text. Once an image has been converted to text, the methods described above may be used to develop CI queries.

Creating Word Vectors from Multiple Data Corpus

Externally produced word vectors may be utilized in at least four ways that we outline (other possibilities will become apparent to those versed in the art). (1) External pre-trained vectors, such as those produced by Google News word vector collection, may be used on the relational database content without having to develop a new model. (2) Alternatively, the database content is trained while initializing vectors for common tokens to the external source vectors, i.e. common tokens appear in both the source database as well as the external database. Common word vectors may be immutable or mutable with updates controlled via parameters, such as learning rate or maximum change. (3) Yet another option is follows: given k distinct external sources, each with a dimension $D(i)$, $i=1, \ldots, k$, a vector of dimension $D=D(1)+ \ldots +D(k)$ is composed. The first $D(1)$ entries are initialized from the $D(1)$ entries of the first source, the following $D(2)$ entries are initialized from the $D(2)$ entries of the second source, and so on, such that each succeeding j'th portion is initialized with the corresponding j'th source. Entries for an individual source can be weighted, for example, a higher weighting value may be given to older information and a lower weighting value may be given for new information as the older information may be deemed more reliable. (4) Finally, the second way (2) can be applied using the vectors produced by the third way (3).

Additionally, individual columns in the database can be encrypted, e.g., last_name. Common words that are also encrypted are treated as different words, thus providing more information concurrent with anonymization.

Similarity UDFs

When comparing two sets of vectors, similarity UDFs may be used to output a scalar similarity value. Similarity measures between any pair of vectors are determined using cosine and max-norm algorithms, however, max-norm is sensitive to contributions of individual vector entries. Precise distances may be needed to rank the results. The distance between a pair of vectors and average multiple distance values are computed to determine the overall similarity value.

Order awareness may be an issue as the relative order of words are being preserved or ignored during the overall similarity computation. In some instances, order conscious similarity is important. Additionally, precise $O(n^2)$ calculations for pairwise distance calculation of n vectors are computationally expensive. In practice, sampled implementations perform well. However, GPU or SIMD acceleration may be necessary for large vector sets. For large datasets, a combination of LSH and precise calculations are necessary.

CI Query Example: World Food Facts Database

The World Food Facts Database (WFFD) is an open source dataset from Kaggle. It stores information on food products from different countries. The WFFD is rich in both text and numeric fields. It contains around 50 MB of text, with over 65,000 rows and 150 columns. The columns contain information such as ingredients, categories, nutrients, etc.

To prepare the WFFD for CI queries, the nutrients were partitioned into groups (vitamins, amino acids, etc.). The numeric values were grouped into clusters using K-means, and the word2Vec model was trained using 200 dimensions. Similarity queries were run over ingredients (text), nutrients (text) and country (text). Both the single-model and the ensemble approach were used. Numeric fields in the WFFD are shown in Table 1.

TABLE 1

| Group Name | Column Name | # Clusters |
| --- | --- | --- |
| Amino Acids | "proteins_100 g", "casein_100 g", "serum_proteins_100 g", nucleotides_100 g" | 600 |
| Carbohydrates | "carbohydrates_100 g", "sugars_100 g", "sucrose_100 g", "glucose_100 g", "fructose_100 g", "lactose_100 g", "maltose_100 g", "maltodextrins_100 g", "starch_100 g", "polyols_100 g", "fiber_100 g" | 5000 |
| Fatty Acids | "fat_100 g", "saturated_fat_100 g", "caprylic_acid_100 g", "capric_acid_100 g", "lauric_acid_100 g", "myristic_acid_100 g", "palmitic_acid_100 g", "stearic_acid_100 g", "arachidic_acid_100 g", "behenic_acid_100 g", "monounsaturated_fat_100 g", "polyunsaturated_fat_100 g", "omega_3_fat_100 g", "alpha_linolenic_acid_100 g", "eicosapentaenoic_acid_100 g", "docosahexaenoic_acid_100 g", "omega_6_fat_100 g", "linoleic_acid_100 g", "arachidonic_acid_100 g", "gamma_linolenic_acid_100 g", "dihomo_gamma_linolenic_acid_100 g", "omega_9_fat_100 g", "oleic_acid_100 g", "gondoic_acid_100 g", "trans_fat_100 g", "cholesterol_100 g" | 5000 |
| Minerals | "salt_100g", "sodium_100 g", "silica_100 g", "bicarbonate_100g", "potassium_100 g", "chloride_100 g", "calcium_100 g", "phosphorus_100 g", "iron_100 g", "magnesium_100 g", "zinc_100 g", "copper_100 g", "manganese_100 g", "fluoride_100 g", "selenium_100 g", "chromium_100 g", "molybdenum_100 g", "iodine_100 g" | 600 |
| Vitamins | "vitamin_a_100 g", "beta_carotene_100 g", "vitamin_d_100 g", "vitamin_e_100 g", "vitamin_k_100 g", "vitamin_c_100 g", "vitamin_b1_100 g", "vitamin_b2_100 g", "vitamin_pp_100g", "vitamin_b6_100 g", "vitamin_b9_100 g", "vitamin_b12_100 g", "biotin_100 g", "pantothenic_acid_100 g" | 600 |

An SQL CI Query example for querying the WFFD is shown below in FIG. 6. The SQL requests items that are in similar countries with similar ingredients and similar nutrients. It should be noted that traditional relational operations 602 are used for value matching and comparisons for the country and ingredient query, while new cognitive UDFs 604 (i.e. proximityAvgMergedData) are used to find similarity between nutrients. Further, it should be noted that similarity may be found using the proximityAvgMergedData UDF when the value is above a certain threshold, while dissimilarity is found when below a certain threshold.

Results for products having similar ingredients and similar nutrients in similar countries is shown in Table 2. For example, Special K original from Kellogg's is similar to Crispy Flakes with Red Berries Cereal from Market Pantry in the United States.

TABLE 2

| Product 1 | Product 2 | Country 1 | Country 2 |
| --- | --- | --- | --- |
| S.Pellegrino-25.3 fl. oz (1 pt 9.3 fl. oz) 750 mL | Perrier-25.3 fl. oz (1 pt 9.3 fl. oz) 750 mL | United States | United States |
| Organic Apple Blueberry Fruit Wrap-Trader Joe's-0.5 OZ (14 g) | Organic Apple Blueberry Fruit Wrap-Trader Joe's-0.5 OZ (14 g) | United States | United States |
| Pimiento del piquillo de Navarra-Landare-150 g | Pimiento del piquillo de Navarra-Verolus-150 g | Spain | Spain |
| Maíz dulce fresco en mazorca-Surinver-2 piezas | Maíz dulce fresco en mazorca-Surinver-400 g (2 mazorcas) | Spain | Spain |
| Nectar multifruits - Helior-6 * 20 cl | Multi enrichi en vitamines B1, B9, B6, C et A-Les Nectars-6 × 20 cl | France | France |
| Special K original-Kellogg's-12 oz (340 g) | Crispy Flakes with Red Berries Cereal-Market Pantry-11.2 OZ (317 g) | United States | United States |
| Pro-Activ (lot x2)-Fruit d'Or-2 * 250 g | Oméga 3&6 Doux-Fruit d'Or-400 g | France | France |
| Fat Free Milk Vitamin A & D-Crystal-1 gallon (3.78 L) | Fat Free Milk Vitamin A & D-Crystal-½ gallon (1.89 L) | United States | United States |
| Nectar multifruits-Leader Price-2 L | Multi12 Nectar-Sans marque-2 L | United States | United States |

Results for products having similar ingredients and similar nutrients in different countries is shown in Table 3. For example, Nutella—Ferrero in the United States is similar to Nutella—750 g in France.

TABLE 3

| Product 1 | Product 2 | Country 1 | Country 2 |
|---|---|---|---|
| Kiri à la crème de lait (32 % MG)-(12 Portions)-240 g | Kiri à la crème de lait-432 g | France | Switzerland |
| Nutella-Ferrero | Nutella-750 g | United States | France, United States |
| Aceite de oliva virgen extra "Carbonell" Gran Selección-750 ml | Aceite de oliva virgen extra "Koipe"-1 l | Spain, Es-europe | Spain |
| Bebida de soja "Frias" Con calcio-1 l | Bebida de soja-Dia-1 l | Spain | Spain, Es-europe |
| Bebida de soja Calcio-Milbona-1 l | Bebida de soja "Alteza"-1 l | Spain | Spain, Es-europe |
| Bebida de soja-Milsani-1 l | Bebida de soja-Dia-1 l | Spain | Spain, Es-europe |
| Nutella-Ferrero-13 oz | Nutella-750 g | United States | France, United States |
| Bebida de soja "Auchan"-1 l | Bebida de soja-Dia-1 l | Spain | Spain, Es-europe |
| Bebida de soja-Milsani-1 l | Bebida de soja "Alteza"-1 l | Spain | Spain, Es-europe |
| Bebida de soja Calcio-Milbona-1 l | Bebida de soja-Dia-1 l | Spain | Spain, Es-europe |

Cognitive Intelligence Queries Use Cases

CI queries may be used in a number of retail cases, such as customer analytics to find similar customers based on buying patterns (e.g., purchased items, frequency, amount spent, etc.) Additionally, CI queries may be used for feature-based product substitution to suggest alternative item similar to a given item but different in some features, such as ingredients, price, nutritional values, etc., allowing for more intelligent recommendations than traditional market-basket recommendations. CI queries may also be used for advanced sales predictions using external data to predict sales of a new item being introduced based on sales of related or similar items currently being sold. CI queries may also be used to analyze historical sales data using external data, for example, using input from social media, recall notices, etc. Semantic associations may be performed via analogy queries to determine relationships, such as "bread:Nutella:: chips:?" the answer may be "salsa" in one region or "guacamole" in a different region.

In the healthcare field, CI queries may also be used in a variety of applications. For example, CI queries may help determine drug-drug interaction using prescription label information (e.g., ingredients, side effects, etc.) from the Federal Drug Administration (FDA) website to identify adverse drug reactions. Patient similarity analytics may also be determined using multi-modal CI queries. For example, patients taking similar drugs, potentially with different brand names (e.g., ADVIL™, MOTRIN™) with similar dosages, may be identified. Also, patients with different scans, such as X-rays or magnetic resonance imaging (MRI) scans, but with similar drug regimens may be identified using a single CI query over text, numeric and image data. Patients with different electro-cardiograms (ECGs), but similar drug regimens may be identified using a single CI query over text, numeric and time series data. CI queries may also be used to give nutrition advice, such as given a food item, find substitute food items with similar ingredients but less sugar. Predictions may be provided using external data, such as given a recall notice affected patients or purchases of similar drugs may be identified.

CI queries may also be used in other fields, such as Information Technology (IT) incident ticket analysis to find accounts with similar ticket patterns (e.g., type of tickets, resolution status, problem cause, etc.). In the financial sector (e.g., consumer banking, investment advisors, etc.), CI queries may be used to find customers with similar transactions, identify similar investment plans for a given investment strategy, or detect anomalies in transactions for a given customer. In the insurance industry, CI queries may be used to identify similar or dissimilar claims using text and image features or to evaluate risk profiles by analyzing patient profiles (e.g., symptoms, diagnosis, etc.). For the Internet of Things (IoT), CI queries may assist in finding households or hotel rooms with similar energy patterns. In Human Resource (HR) management, CI queries may be used to find employees with similar skills and similar or different employment history. CI queries may also be used in other industries such as customer care, semantic web, log analytics, smart cities, etc. These are just a few of the many uses for CI queries using embodiments of the present invention.

Cognitive Intelligence Server

Figure 7:
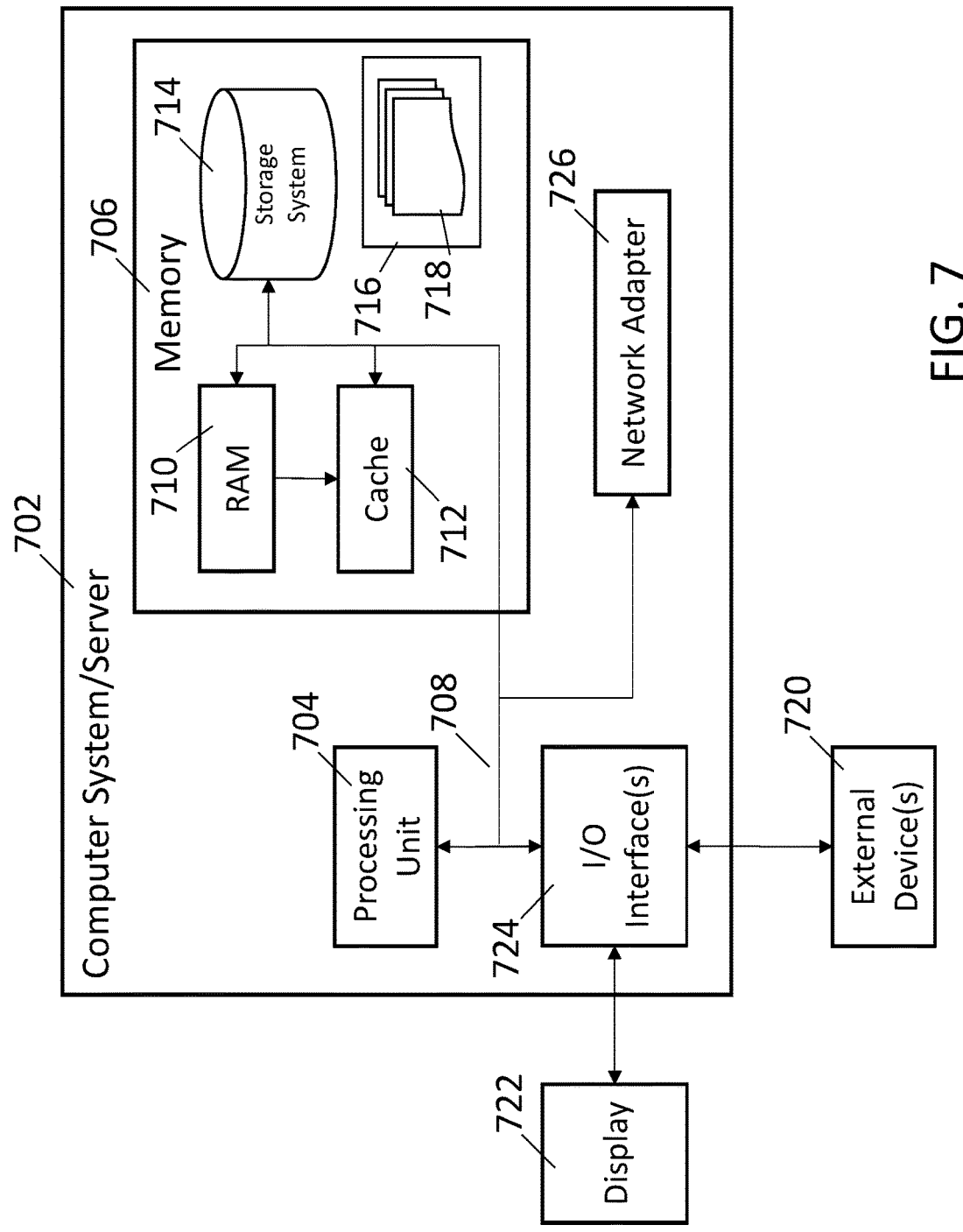
FIG. 7 depicts an example CI relational system in accordance with the present invention.

Referring now to FIG. 7, a block diagram illustrating an information processing system 700 that can be utilized in embodiments of the present invention is shown. The information processing system 702 is based upon a suitably configured processing system configured to implement one or more embodiments of the present invention (e.g., cognitive data management system 100). Any suitably configured processing system can be used as the information processing system 702 in embodiments of the present invention. The components of the information processing system 702 can include, but are not limited to, one or more processors or processing units 704, a system memory 706, and a bus 708 that couples various system components including the system memory 706 to the processor 704.

The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 7, the main memory 706 may include structured data sources 106, cognitive intelligence queries 102, machine learning model 104 and structured results 108 shown in FIG. 1. One or more of these components can reside within the processor 704, or be a separate hardware component. The main memory 706 can also include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present invention.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present invention.

The information processing system 702 can also communicate with one or more external devices 720 (such as a keyboard, a pointing device, a display 722, etc.); one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 726. As depicted, the network adapter 726 communicates with the other components of information processing system 702 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems. Although not shown, additional graphical processing units (GPUs) may sit of the bus 708 and act as co-processors.

Non-Limiting Embodiments

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit"," "module", or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for adapting a relational database containing multiple data types across a plurality of rows storing a plurality of tokens, the method comprising:
    converting non-text tokens in the relational database to a textual form;
    producing a textual sentence for each row of the plurality of rows based on relations between tokens in the relational database;
    producing a set of word vectors based on the textual sentences by:
        computing a plurality of sets of preliminary word vectors by applying multiple embedding models over all tokens in the textual sentences, the multiple embedding models comprising user-controlled clustering to form clustering groups;
        determining semantic similarity between preliminary word vectors based on a distance metric; and
        merging the sets of preliminary word vectors by finding an intersection between row-sets that represent results for each clustering group to form the set of word vectors; and
    applying a cognitive intelligence query expressed as a structured query language (SQL) query to the relational database using the set of word vectors.

2. The method of claim 1, wherein said non-text tokens are stored in the relational database in a form selected from a group consisting of: a numeric value, an SQL type, an image, a video, a time series, latitude and longitude, and chemical structures.

3. The method of claim 1, wherein said producing a set of word vectors based on the textual sentences comprises applying a single word embedding model over all tokens in the text.

4. The method of claim 3, wherein the single word embedding model includes an element for one or more columns of the relational database.

5. The method of claim 1, wherein the structured query language (SQL) query is augmented with user-defined functions.

6. The method of claim 1, further comprising receiving the structured query language query and storing query results in a second relational database.

7. The method of claim 1, wherein the distance metric is a cosine distance.

8. A cognitive intelligence system comprising:
a memory storing computer instructions;
a processor, operably coupled with the memory, which:
- converts non-text tokens in a relational database to a textual form, wherein the relational database contains multiple data types across a plurality of rows storing a plurality of tokens;
- produces a textual sentence for each row of the plurality of rows based on relations between tokens in the relational database;
- produces a set of word vectors based on the textual sentences by:
  - computing a plurality of sets of preliminary word vectors by applying multiple embedding models over all tokens in the textual sentences, the multiple embedding models comprising user-controlled clustering to form clustering groups;
  - determining semantic similarity between preliminary word vectors based on a distance metric; and
  - merging the sets of preliminary word vectors by finding an intersection between row-sets that represent results for each clustering group to form the set of word vectors; and
- applies a cognitive intelligence query expressed as a structured query language (SQL) query to the relational database using the set of word vectors.

9. The cognitive intelligence system of claim 8, wherein said non-text tokens are stored in the relational database in a form selected from a group consisting of: a numeric value, an SQL type, an image, a video, a time series, latitude and longitude, and chemical structures.

10. The cognitive intelligence system of claim 8, wherein the memory further stores the relational database.

11. The cognitive intelligence system of claim 8, wherein the processor produces the set of word vectors based on the textual sentences by applying a single word embedding model over all tokens in the text.

12. The cognitive intelligence system of claim 11, wherein the single word embedding model includes an element for one or more columns of the relational database.

13. The cognitive intelligence system of claim 8, wherein the structured query language (SQL) query is augmented with user-defined functions.

14. The cognitive intelligence system of claim 8, wherein the processor further receives the structured query language query and stores query results in a second relational database.

15. The cognitive intelligence system of claim 8, wherein the distance metric is a cosine distance.

16. A computer program product for adapting a relational database containing multiple data types across a plurality of rows storing a plurality of tokens, the computer program product comprising a computer readable storage medium having program instructions embodied therewith, the program instructions executable by a processing circuit to cause the processing circuit to:
- convert non-text tokens in the relational database to a textual form;
- produce a textual sentence for each row of the plurality of rows based on relations between tokens in the relational database; produce a set of word vectors based on the textual sentences by:
  - computing a plurality of sets of preliminary word vectors by applying multiple embedding models over all tokens in the textual sentences, the multiple embedding models comprising user-controlled clustering to form clustering groups;
  - determining semantic similarity between preliminary word vectors based on a distance metric; and
  - merging the sets of preliminary word vectors by finding an intersection between row-sets that represent results for each clustering group to form the set of word vectors; and
- apply a cognitive intelligence query expressed as a structured query language (SQL) query to the relational database using the set of word vectors.

17. The computer program product of claim 16, wherein said non-text tokens are stored in the relational database in a form selected from a group consisting of: a numeric value, an SQL type, an image, a video, a time series, latitude and longitude, and chemical structures.

18. The computer program product of claim 16, wherein the distance metric is a cosine distance.

* * * * *